Oct. 13, 1942.    R. TAMPIER    2,298,642
BALL JOINT
Filed May 31, 1940    2 Sheets-Sheet 1

Inventor
René Tampier
by
Attorney

Oct. 13, 1942.  R. TAMPIER  2,298,642
BALL JOINT
Filed May 31, 1940  2 Sheets-Sheet 2

Inventor
Rene Tampier
by
Attorney

Patented Oct. 13, 1942

2,298,642

UNITED STATES PATENT OFFICE 2,298,642

BALL JOINT

René Tampier, Cricklewood, London, England

Application May 31, 1940, Serial No. 338,214
In Great Britain June 17, 1939

5 Claims. (Cl. 287—90)

This invention relates to ball joints of the kind in which the ball is located in a casing, means comprising a member axially slidable in the casing and actuated by a spring to exert pressure on the ball, means for retaining the ball in the casing, and means for releasing the ball when it is desired to remove the ball from the casing.

Among the objects of the invention are to provide a ball joint of the kind described in which the locking means comprise co-operating surfaces having a substantial area of contact; which can be of minimum diameter and weight; in which the operating means can be totally enclosed; and in which, in case of fracture of one operating part provision is made for preventing the accidental removal of the ball.

The invention is illustrated by way of example in the accompanying drawings, wherein.

Figure 1:
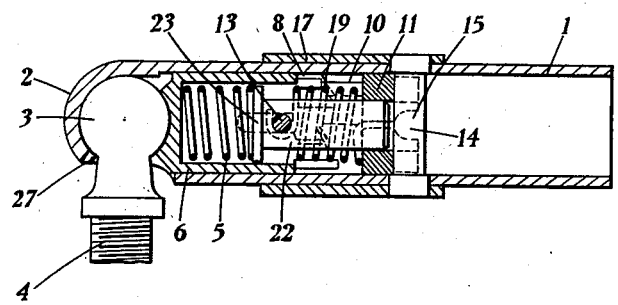
Figures 1, 2 and 3 are respectively longitudinal section plan and end view of a ball joint made according to the present invention.
Figure 2:
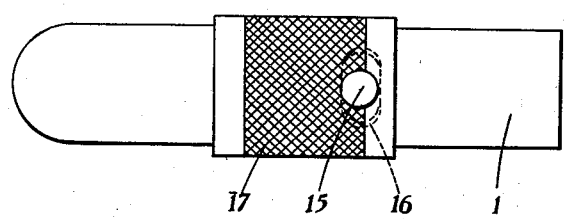
Figure 3:
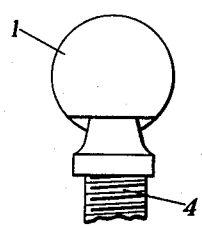

Referring first to Figures 1-6, 1 is a tubular casing having one end formed as a ball socket 2 adapted to receive a ball 3 carried on the end of a spindle 4. A compression spring 5, disposed in a hollow block 6 having a spherical surface at one end presses the spherical surface of the block against the ball. The ball can be locked in its socket by means of a locking device comprising four helically shaped surfaces 7 formed on the outer ends of tooth like projections 8 on the block 6, which surfaces co-operate with similar helically shaped surfaces 9 formed on the ends of tooth like projections 10 on a second block 11. The block 6 is slidable axially in the casing 1 by reason of two oppositely disposed recesses 12 in its wall which engage on a pin 13 extending transversely of the casing 1, and carried in the wall thereof.

This arrangement permits of axial sliding movement of the block 6, but prevents the latter rotating in the casing 1. On the other hand, the block 11 is rotatably mounted in the casing 1 but is not slidable axially therein. To this end the block 11 has a pair of oppositely disposed recesses 14 which are engaged by a pin 15 mounted in oppositely disposed slots 16 in the casing 1, which slots are arranged, as can clearly be seen in Figure 2, to permit the pin to be rocked in a plane transverse to the casing, but to prevent any substantial axial movement thereof relatively to the casing. The ends of the pin 15 are rigid with a knurled sleeve 17 rotatably mounted on the casing 1, the arrangement being such that rotation of the sleeve 17 rocks the pin 15 in the slots 16.

An additional pair of recesses 18, disposed respectively at 90° to the slots 14 are provided for the purpose hereafter described.

The block 11 is placed under torsion by a torsion spring 19 one end of which is connected to the pin 13, and the other end of which is anchored in a hole 20 drilled in the base 21 of the block 11, which is also bored centrally to receive one end of a guide pin 22 for the spring 19, the other end of the pin 22 being formed with an enlarged piston-like head 23, which constitutes an abutment for the compression spring 5.

Figure 4:
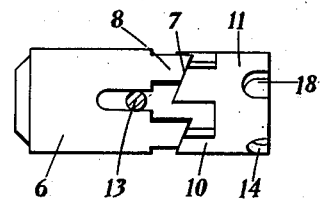
Figures 4 and 5 are detail views of the same operative parts, showing these parts in positions corresponding respectively to the locking and unlocking of the ball.
Figure 5:
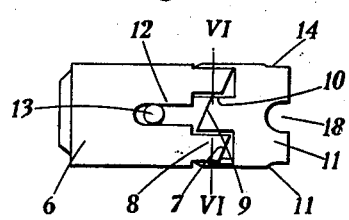
Figure 6:
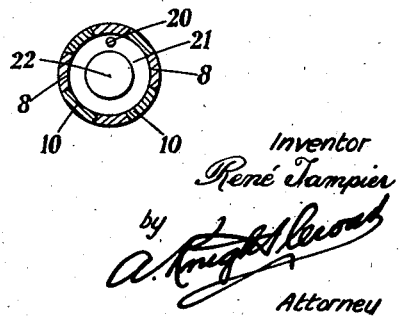
Figure 6 is a section on line VI—VI, Figure 5.

The arrangement is such that the torsion spring 19 normally tends to rotate the block 11 in the casing 1, thus causing the helical surfaces 9 to bear against the helical surfaces 7. Since the block 6 is free to slide axially, whilst the block 11 is fixed axially it will readily be evident that the torsion spring 19 will provide an axial pressure on the block 6 additional to the pressure exerted by the compression spring 5, and this additional pressure provides for effectively locking the ball 3 in the socket 2, so that it cannot be released from its socket. The positions of the parts 6 and 11 corresponding to this locking of the ball are shown in Figure 4.

If now it is desired to remove the ball from its socket the sleeve 17 is rotated against the action of the spring 19, in order to rotate the block 11 into a position in which the teeth 10 are in line with the gaps between the teeth 8. In this poistion an outward pull on the spindle 4 will slide the block 6 to the right and permit the ball to be removed since the teeth on the block 6 can now engage in the gaps between the teeth on the block 11. This position of the parts is clearly shown in Fig. 5.

The additional pair of recesses 18 in the block 11 provide means for adjusting the torsion on the block 11, since either pair of recesses 14 or 18 can be engaged by the pin 15. Further, one pair of recesses can be engaged by a tool, whilst the pin 15 is engaged in the other pair.

Figure 7:
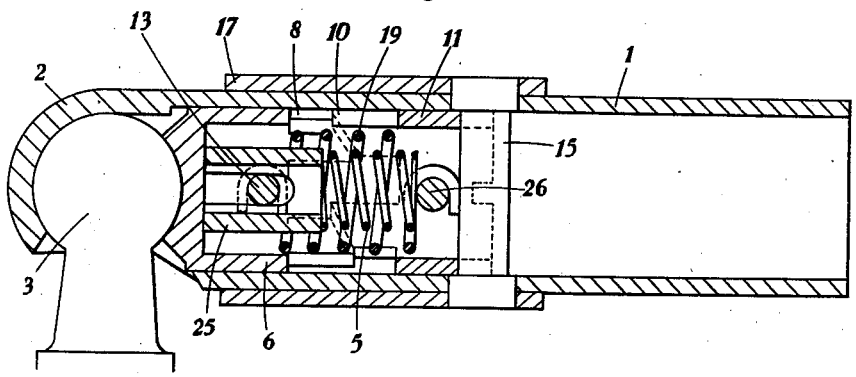
Figure 7 is a longitudinal section and Figure 8 is a plan view of a modification.
Figure 8:
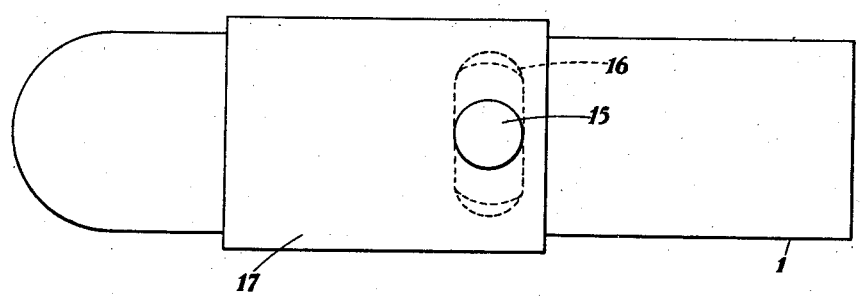

In a modification of the device, as illustrated in Figures 7 and 8, in which like reference numerals relate to like parts, the compression spring 5 is of smaller diameter than, and is disposed inside, the torsion spring 19, and bears against one end of a tubular member 25, the other end of which bears against the socket head of the block 6. The only other difference is that the one end of the torsion spring 19 is secured to a pin 26 extending transversely of, and secured to the wall of the block 11, the base of which is hollow and not solid as in Figure 1.

Figure 9:
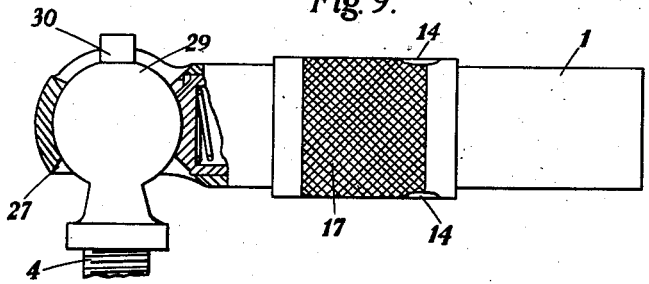
Figures 9 and 10 are respectively side elevation and plan view of a further modification applicable to both the constructions shown in Figures 1-8.
Figure 10:
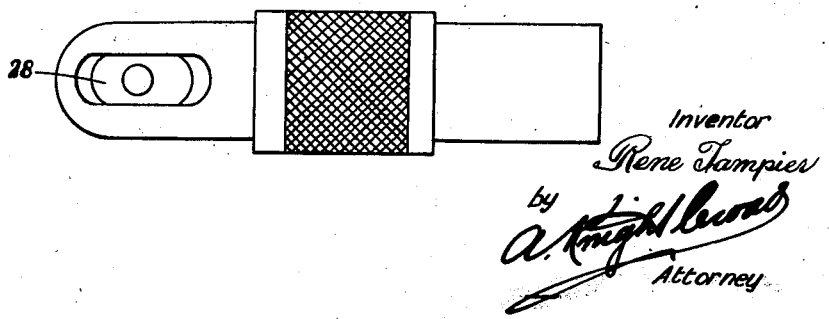

Both forms of device may be modified as shown in Figures 9 and 10, in which the casing 1 has a slot 29 in the wall above the aperture 27 and the ball carries a projection 30 adapted to move in this slot and to cooperate with the edges thereof, to limit the extent of movement of the ball in any direction, i. e. both laterally and endwise. This arrangement prevents breakage of the neck of the spindle which might occur if the angular movement is excessive.

In a ball joint made according to the invention only a small rotary movement is necessary to release the ball, and a second movement is required to compress the spring 5 before removing the ball. This enables the block 6 to be pressed directly and continuously against the ball, eliminating any friction which might hinder or obstruct its movement. The springs employed may be of small diameter, keeping the weight to a minimum, and they may be enclosed to retain lubricant and prevent other parts from projecting between the helical surfaces. The joints may be of small diameter so that connecting tubes and like members can be placed closely together. In the case of aircraft, this permits, for example, of using lighter guides on the run of the controls.

By reason of employing two springs in the event of breakage of the torsion spring, the compression spring is still left to act on the ball and prevent its removal.

What I claim is:

1. A ball joint comprising a casing, a ball located in said casing, a tubular member, having a closed socket end, axially slidable in the casing, a spring disposed inside said axially slidable member and pressing its socket end into contact with said ball, means for holding said axially slidable member against rotation, so that any wear on the end in contact with the ball adapts it to the exact shape of the ball, pressure means acting on said axially slidable member to retain the ball in the casing, said pressure means comprising a plurality of helical surfaces on the axially slidable member, a rotatable member normally tending to rotate in the casing, a plurality of helical surfaces on the rotatable member adapted to co-operate with the helical surfaces on the axially slidable member to convert the torsion on the rotatable member into an axial thrust on the axially slidable member, and means for releasing the ball from the casing when desired.

2. A ball joint comprising a casing, a ball located in said casing, a spring-actuated member axially slidable in the casing and adapted to exert pressure on said ball, pressure means acting on said axially slidable member to retain the ball in the casing, said pressure means comprising a plurality of tooth-like projections on the axially slidable member, a helical surface on each of said tooth-like projections, a rotatable member normally tending to rotate in the casing, a plurality of tooth-like projections on the rotatable member, a helical surface on each of said tooth-like projections, said helical surfaces being adapted to co-operate with the helical surfaces on the axially slidable member to convert the torsion on the rotatable member into an axial thrust on the axially slidable member, and a sleeve surrounding said casing, a pin operatively connecting said sleeve to said rotatable member, whereby the rotatable member can be turned against the action of the torsion spring, to permit the projections on the axially slidable member to enter in the gaps between the projections on the rotatable member to permit the ball to be released from the casing.

3. A ball joint comprising a casing, a ball located in said casing, a member axially slidable in the casing, a spring acting axially on said member to press it against said ball, additional pressure means acting on said axially slidable member to retain the ball in the casing, said additional pressure means comprising a plurality of helical surfaces on the axially slidable member, a rotatable member in said casing, a torsion spring disposed in axial alignment with said spring acting axially on the axially slidable member, said torsion spring being prestrained on assembly and acting on said rotatable member so as to tend to rotate it in the casing, a plurality of helical surfaces on the rotatable member adapted to co-operate with the helical surfaces on the axially slidable member to convert the torsion on the rotatable member into an axial thrust on the axially slidable member, and means for releasing the ball from the casing when desired.

4. A ball joint comprising a casing, a ball located in said casing, a member axially slidable in the casing, a spring acting axially on said member to press it against said ball, additional pressure means acting on said axially slidable members to retain the ball in the casing, said additional pressure means comprising a plurality of helical surfaces on the axially slidable member, a rotatable member in said casing, a torsion spring surrounding the spring which acts axially on the axially slidable member, said torsion spring being prestrained on assembly and acting on said rotatable member so as to tend to rotate it in the casing, a plurality of helical surfaces on the rotatable member adapted to co-operate with the helical surfaces on the axially slidable member to convert the torsion on the rotatable member into an axial thrust on the axially slidable member, and means for releasing the ball from the casing when desired.

5. A ball joint comprising a casing having a slot, a ball located in said casing, a projection on said ball engaging said slot, the edges of which limit the amplitude of movement of the ball in the casing, a member, having a closed socket end, axially slidable in the casing, a spring disposed inside said axially slidable member and pressing its socket end into contact with said ball, pressure means acting on said axially slidable member to retain the ball in the casing, said pressure means comprising a plurality of helical surfaces on the axially slidable member, a rotatable member normally tending to rotate in the casing, a plurality of helical surfaces on the rotatable member adapted to co-operate with the helical surfaces on the axially slidable member to convert the torsion on the rotatable member into an axial thrust on the axially slidable member, and means for releasing the ball from the casing when desired.

RENÉ TAMPIER.